(12) United States Patent
Gillett et al.

(10) Patent No.: US 10,226,026 B2
(45) Date of Patent: Mar. 12, 2019

(54) RAISED SLUNG PET BED ASSEMBLY

(71) Applicant: Pet Perch, LLC, Gardner, KS (US)

(72) Inventors: Sharon A. Gillett, Gardner, KS (US);
Michael H. Gillett, Gardner, KS (US)

( * ) Notice: Subject to any disclaimer, the term of this patent is extended or adjusted under 35 U.S.C. 154(b) by 401 days.

(21) Appl. No.: 15/231,354

(22) Filed: Aug. 8, 2016

(65) Prior Publication Data

US 2017/0035022 A1    Feb. 9, 2017

Related U.S. Application Data

(60) Provisional application No. 62/202,493, filed on Aug. 7, 2015.

(51) Int. Cl.
*A01K 1/03* (2006.01)
*A01K 1/035* (2006.01)

(52) U.S. Cl.
CPC ............ *A01K 1/0353* (2013.01); *A01K 1/033* (2013.01)

(58) Field of Classification Search
CPC ........ A47D 1/00; A47D 13/10; A01K 1/0353; A01K 1/033
See application file for complete search history.

(56) References Cited

U.S. PATENT DOCUMENTS

| | | | |
|---|---|---|---|
| 5,072,694 A * | 12/1991 | Haynes | ................ A01K 1/0353 119/28.5 |
| 5,136,981 A | 8/1992 | Barreto, III et al. | |
| 5,860,389 A | 1/1999 | Caldwell | |
| 5,964,189 A | 10/1999 | Northrop et al. | |
| 6,044,794 A | 4/2000 | Raitanen et al. | |
| 6,286,456 B1 | 9/2001 | Michaelis | |
| 6,435,133 B1 | 8/2002 | Wayne, Jr. | |
| 6,591,778 B1 * | 7/2003 | Alderman | ............ A01K 1/0353 119/28.5 |
| 7,444,958 B2 | 11/2008 | Quinn | |
| 7,540,259 B2 | 6/2009 | Pape et al. | |
| 7,886,693 B1 | 2/2011 | Salzman et al. | |
| 7,926,447 B2 | 4/2011 | Flannery | |
| 8,381,333 B2 | 2/2013 | Friedman | |
| 2007/0007804 A1 * | 1/2007 | Pemberton | .............. A47D 13/10 297/260.2 |
| 2007/0111809 A1 * | 5/2007 | Bellows | .................... A47D 9/02 472/118 |
| 2008/0012406 A1 * | 1/2008 | Piwko, Jr. | ............ A47D 13/107 297/217.3 |
| 2008/0127897 A1 * | 6/2008 | Flannery | .............. A01K 1/0353 119/28.5 |

(Continued)

*Primary Examiner* — Monica L Williams
(74) *Attorney, Agent, or Firm* — Law Office of Mark Brown, LLC; Christopher M. DeBacker

(57) ABSTRACT

A raised pet bed assembly consisting generally of a main frame having an upper loop and a lower loop connected at a riser sleeve which may include a spring or hinge to allow the upper loop to gently bounce. A soft fabric sling lays into the top loop of the frame and is connected to the frame using loops or other connectors. Loops within the sling could be slid into the frame members of the top loop. A padded insert can be placed into the sling portion for use on cooler days or for additional comfort. These parts can easily be removed for cleaning and would be washable in a commercial clothes washer. A canopy can be placed on wire supports above the fabric sling, and a cover can provide an enclosure within the frame.

4 Claims, 18 Drawing Sheets

(56) References Cited

U.S. PATENT DOCUMENTS

| | | | |
|---|---|---|---|
| 2010/0201171 A1* | 8/2010 | Velderman | A47D 9/02 297/260.2 |
| 2010/0307424 A1 | 12/2010 | Evens | |
| 2012/0318206 A1 | 12/2012 | Van Leeuwen | |
| 2013/0285425 A1* | 10/2013 | Chen | A47D 1/00 297/260.2 |
| 2014/0068859 A1* | 3/2014 | Alegria | A47D 1/00 5/424 |
| 2015/0238024 A1* | 8/2015 | Lucas | A47D 1/00 297/181 |

* cited by examiner

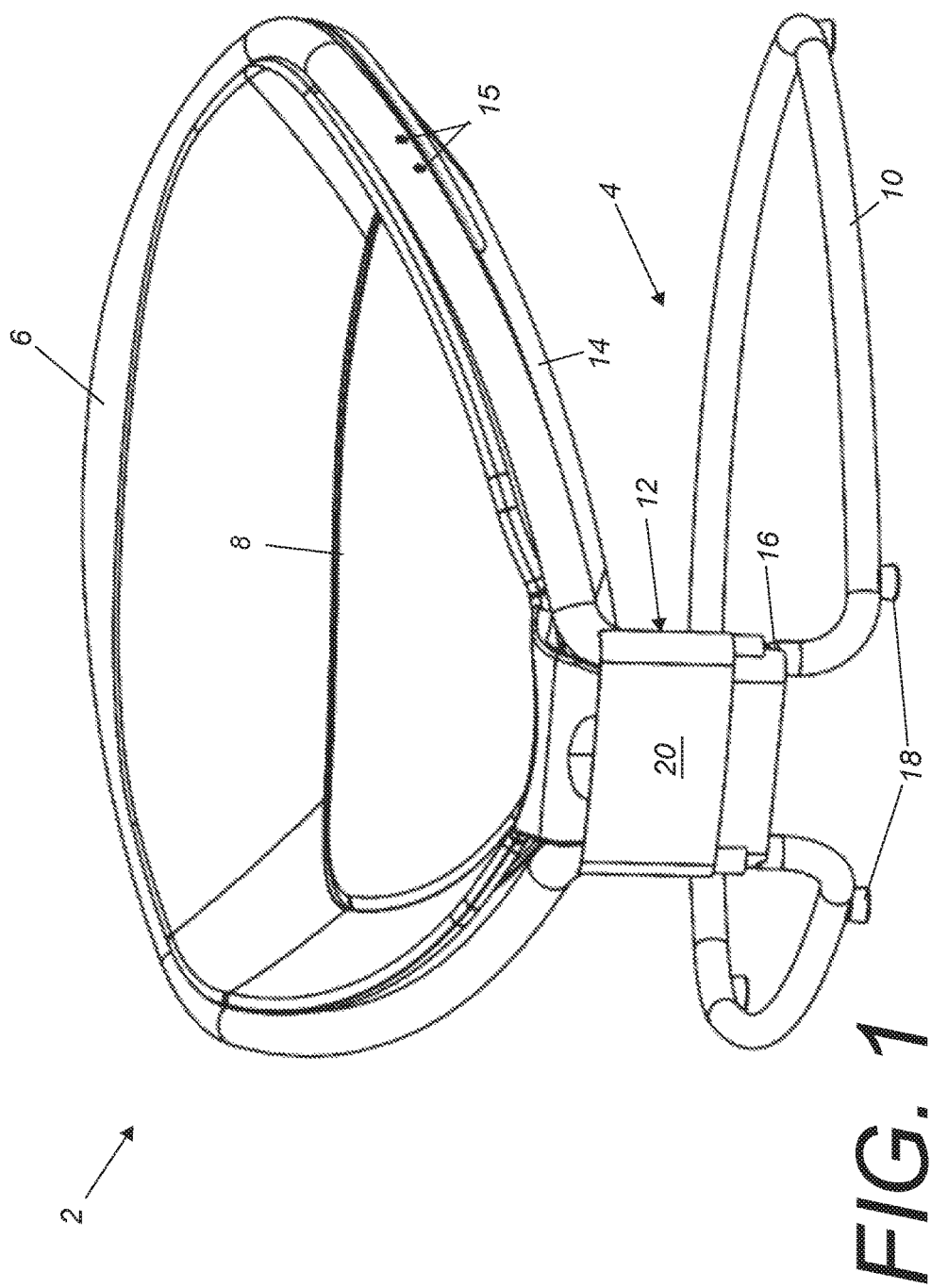

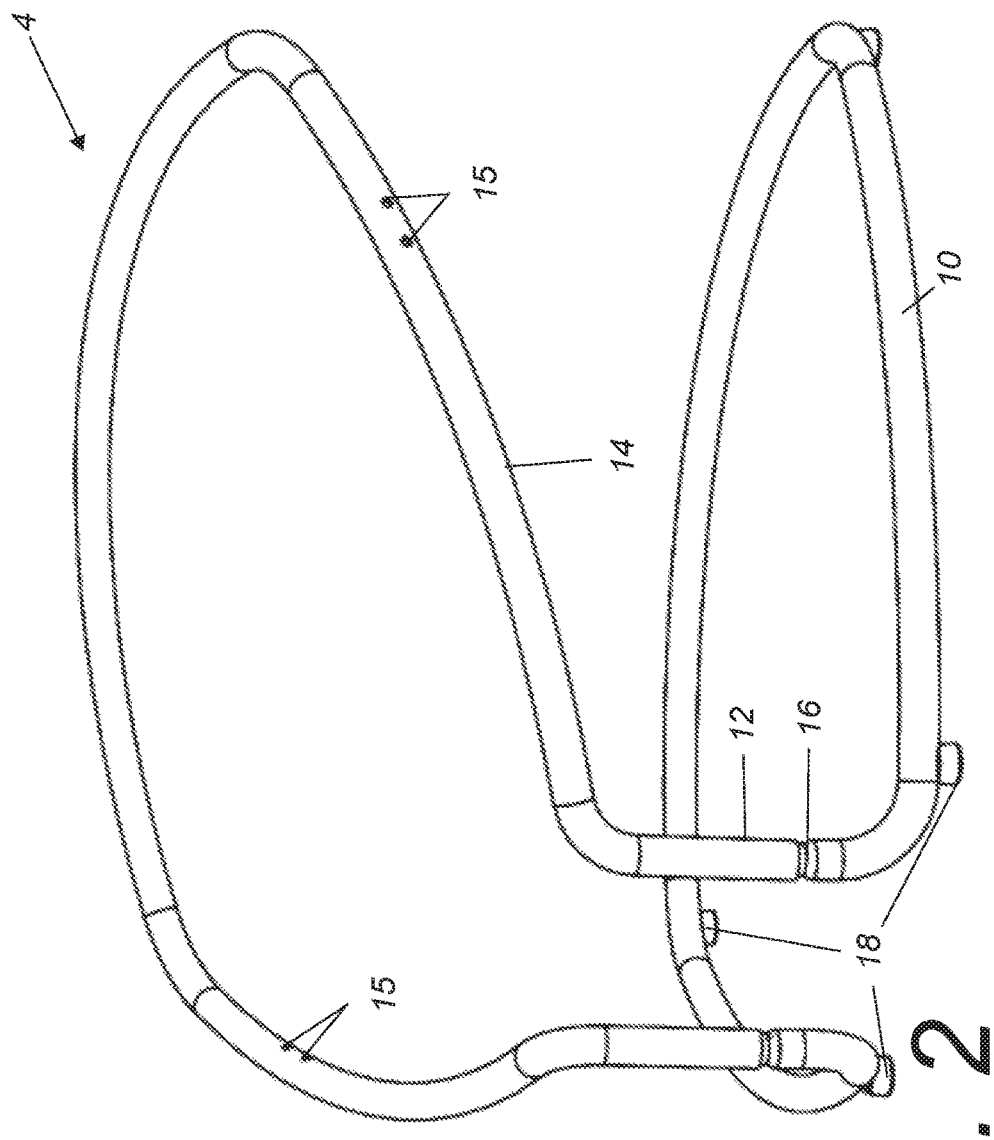

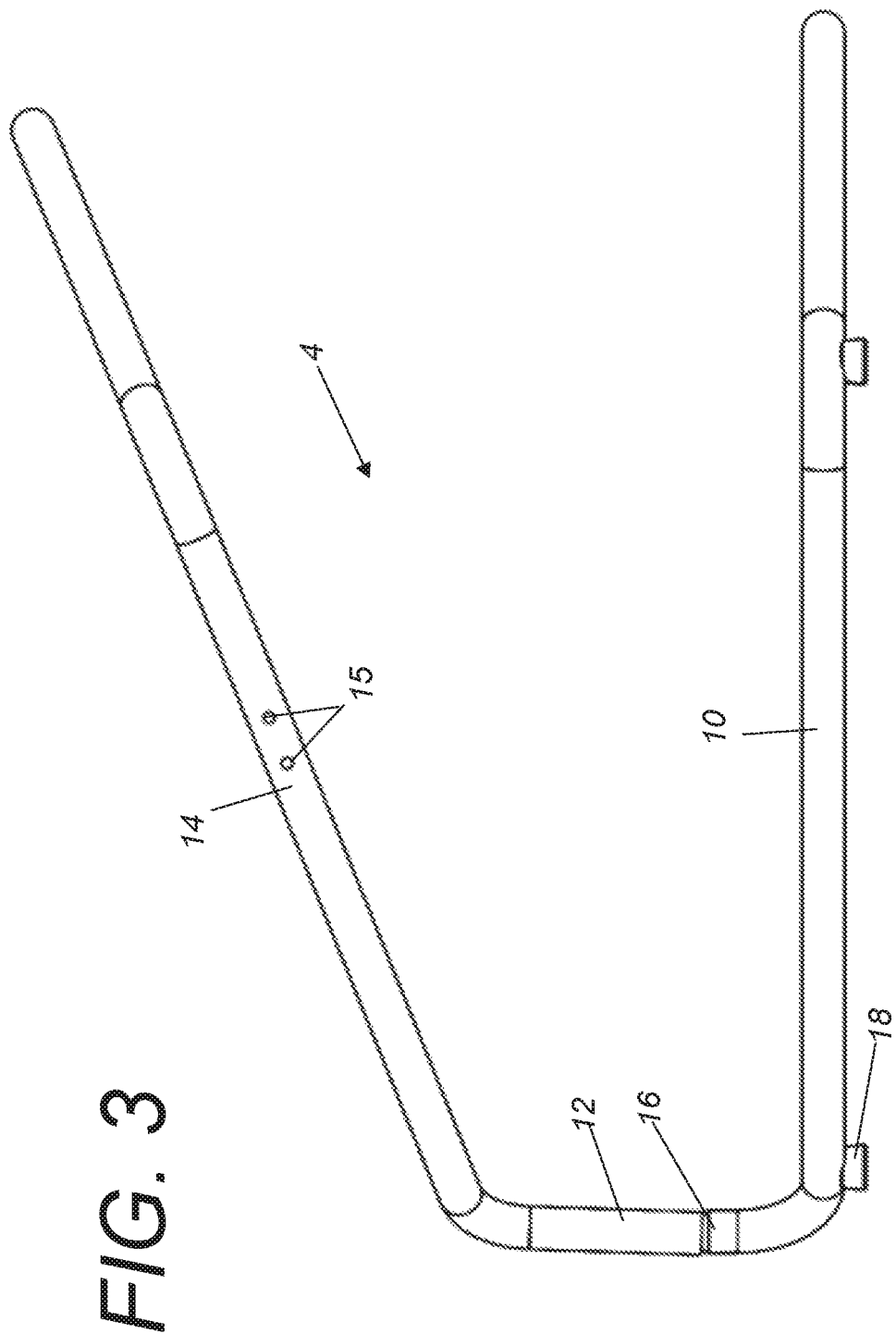

US 10,226,026 B2

RAISED SLUNG PET BED ASSEMBLY

CROSS-REFERENCE TO RELATED APPLICATION

This application claims priority in U.S. Provisional Patent Application No. 62/202,493, filed Aug. 7, 2015, which is incorporated herein by reference.

BACKGROUND OF THE INVENTION

1. Field of the Invention

The present invention relates generally to a pet bed assembly and method for use thereof, and more specifically to a raised slung pet bed assembly having a raised bed located on a spring base.

2. Description of the Related Art

Most existing pet beds are foam or fiber-filled pads which are placed on the floor. These components tend to hold smells and dirt from the pet, puts the pet close to household flooring near crawling pests, and provides limited air circulation around the pet. These existing beds also tend to be large and bulky when being shipped or transported, and display poorly at retail. Existing raised pet beds tend to be large, bulky, heavy, ornate, and expensive. What is needed is a highly compact raised pet bed which maximizes floor space while providing an easy-to-clean elevated pet resting surface.

Heretofore there has not been available a raised pet bed apparatus with the advantages and features of the present invention.

BRIEF SUMMARY OF THE INVENTION

The present invention generally provides a raised pet bed assembly consisting generally of a main frame having an upper loop and a lower loop connected at a riser sleeve which may include a spring or hinge to allow the upper loop to gently bounce. A soft fabric sling lays into the top loop of the frame and is connected to the frame using loops or other connectors. Loops within the sling could be slid into the frame members of the top loop. A padded insert can be placed into the sling portion for use on cooler days or for additional comfort. These parts can easily be removed for cleaning and would be washable in a standard clothes washer, or may be hand-washable.

An optional embodiment could include a pair of canopy support wires which extend above the upper loop of the frame and support a cloth canopy over the top of the fabric sling. An opening in the front end of the canopy near the riser sleeve(s) allows access to the enclosed area.

Yet another alternative embodiment could include elongated riser sleeves which raise the fabric sling higher above the ground and a fabric cover which covers the space between the upper loop and lower loop of the frame with one or more access points for the lower enclosure.

BRIEF DESCRIPTION OF THE DRAWINGS

The drawings constitute a part of this specification and include exemplary embodiments of the present invention illustrating various objects and features thereof.

FIG. 1 is a three-dimensional isometric view of a preferred embodiment of the present invention.

FIG. 2 is a three-dimensional isometric view of a frame component thereof

FIG. 3 is a side elevational view thereof.

DETAILED DESCRIPTION OF THE PREFERRED EMBODIMENTS

I. Introduction and Environment

Figure 2A:
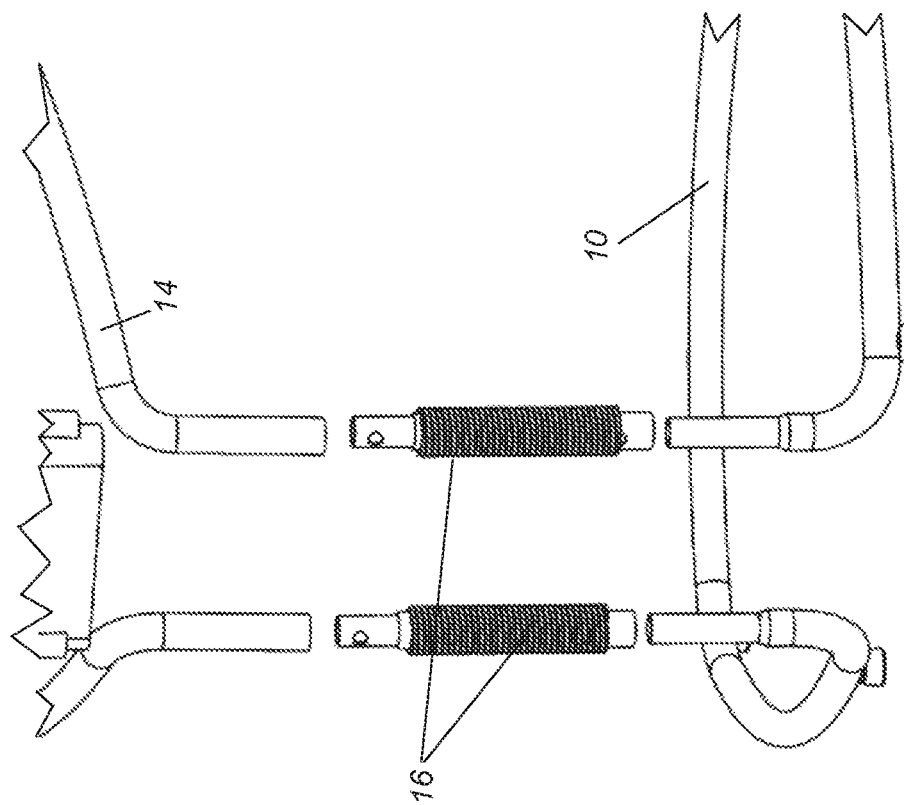
FIG. 2A is a partially exploded three-dimensional isometric view of a close-up thereof showing a spring element.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof Forwardly and rearwardly are generally in reference to the direction of travel, if appropriate. Said terminology will include the words specifically mentioned, derivatives thereof and words of similar meaning.

II. Preferred Embodiment Raised Slung Pet Bed 2

Referring to the figures in more detail, FIG. 1 shows a preferred embodiment raised slung pet bed 2 generally constructed from a frame 4 having a lower loop 10 and an upper loop 14 joined by a pair of riser sleeves 12. A fabric sling 6 is connected to the upper loop 14 using loops or other connection elements connected to the edges of the sling. A padded insert 8 is placed within the fabric sling. The fabric sling 6 and pad 8 provide a raised platform for use by a pet animal where air is allowed to freely circulate about the entire bed area. There are insert holes 15 located within the upper loop 14 which can be used to attach optional attachment devices such as a canopy as shown in later figures.

Figure 4:
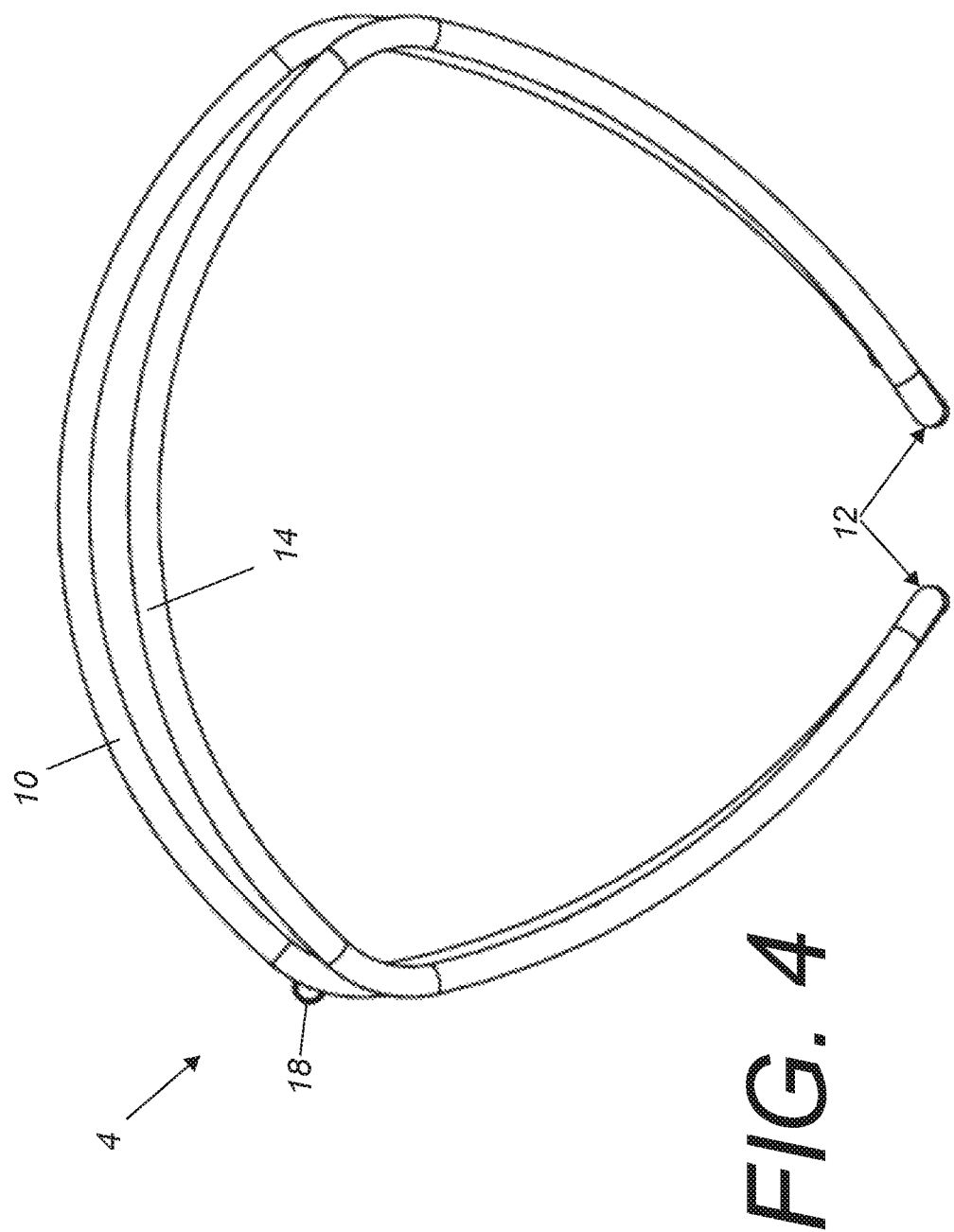
FIG. 4 is a top plan view thereof.

FIG. 2 shows the frame 4 alone, including the upper loop 14, the lower loop 10, and the riser sleeves 12 which join the two loops and cover the optional springs 16 which allow the upper loop 14 to have some limited bounce or give when used by a pet. The feet 18 protect flooring from the lower loop 10 and prevent the entire assembly from sliding around on smooth floors. As can be seen, the upper 14 and lower 10 loops may be assembled from multiple pieces of interlocking tubing. FIGS. 3-4 show alternative views of the frame 4. FIG. 2A provides a closer view of the springs 16 as they interface with the upper loop 14 and lower loop 10 of the frame 4. The springs are optional and may be removed to provide a more rigid connection between the upper loop 14 and lower loop 10. A front flap 20 of the insert 8 fits over a similar flap 21 of the fabric sling 6 to cover the springs 16 and/or riser sleeves 12.

Figure 5:
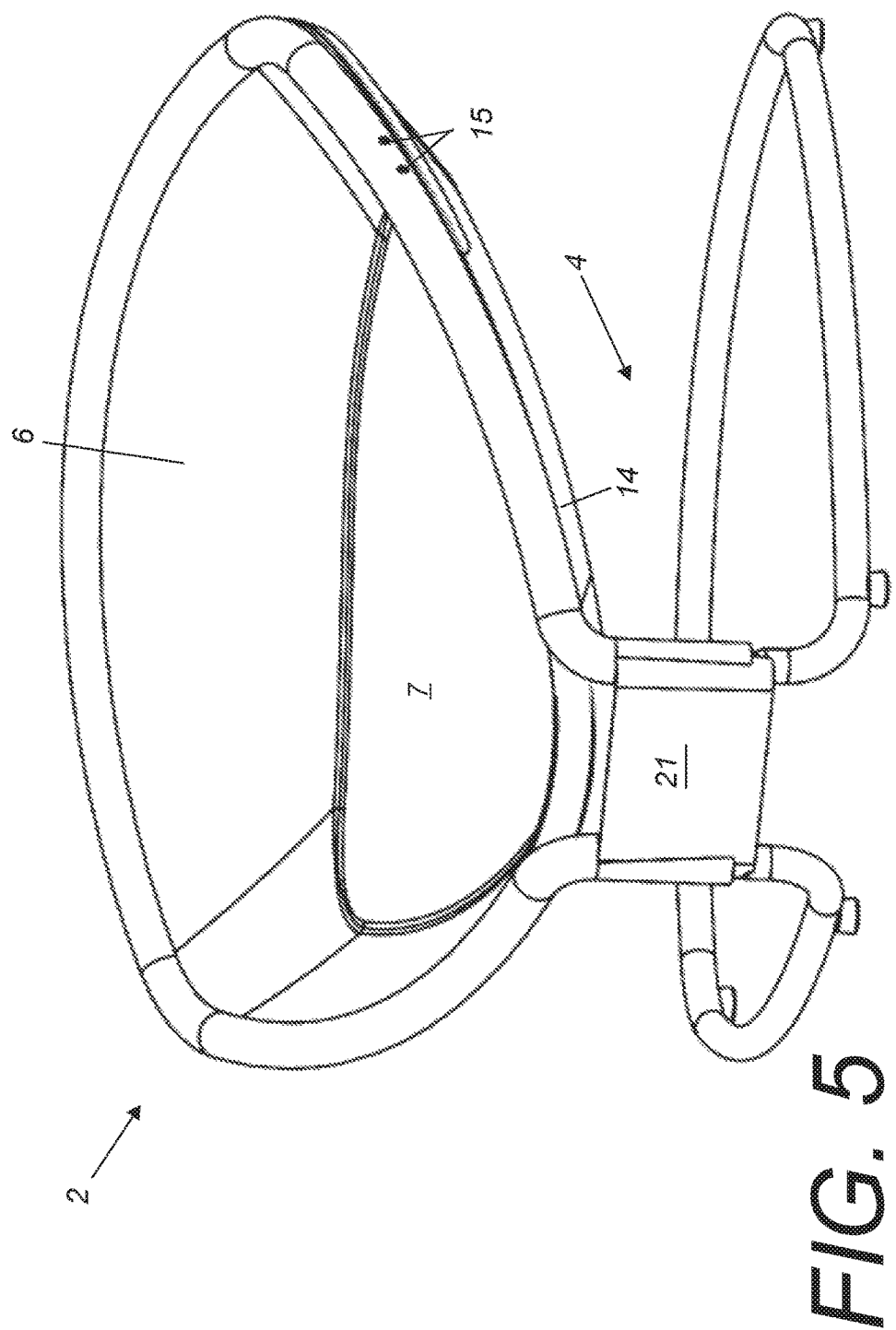
FIG. 5 is a three-dimensional isometric view of the preferred embodiment of the present invention shown without a padded insert element.
Figure 6:
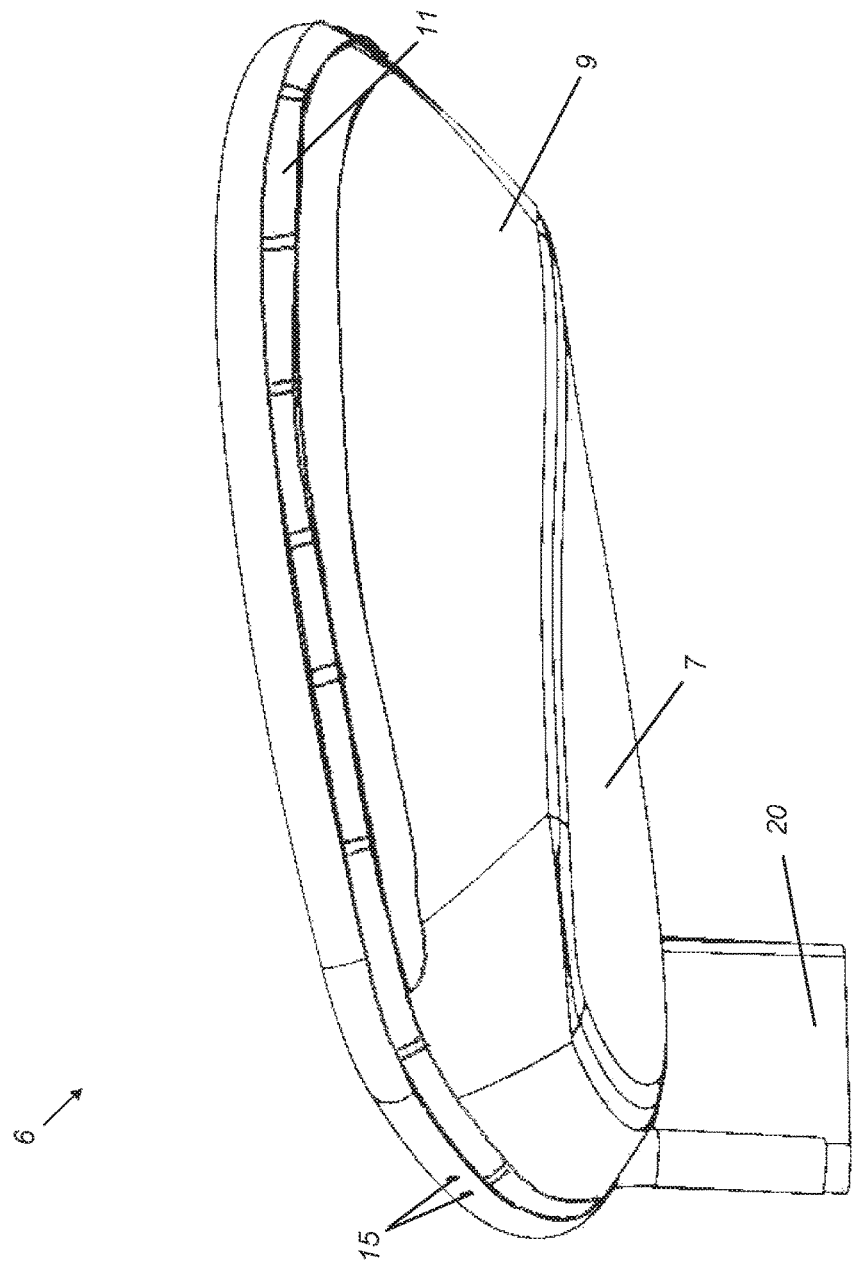
FIG. 6 is a side-elevational view of a fabric sling element thereof.

FIG. 5 shows the frame 4 receiving the fabric sling 6 within the upper loop 14 of the frame. The sling may be slipped over the tubing of the frame or otherwise attached to the frame using straps with hook-and-loop fasteners, snaps, or other typical attachment elements. A front flap 21 wraps about the riser sleeves 12. The base 7 of the fabric sling 6 could be used by a pet with or without a padded insert 8. FIG. 6 shows a side view of the fabric sling 6 including a better view of the sidewalls 9 and a lip 11 which may receive the upper loop 14 of the frame 4. Note that the lip 11 includes holes for the insert holes 15.

Figure 7:
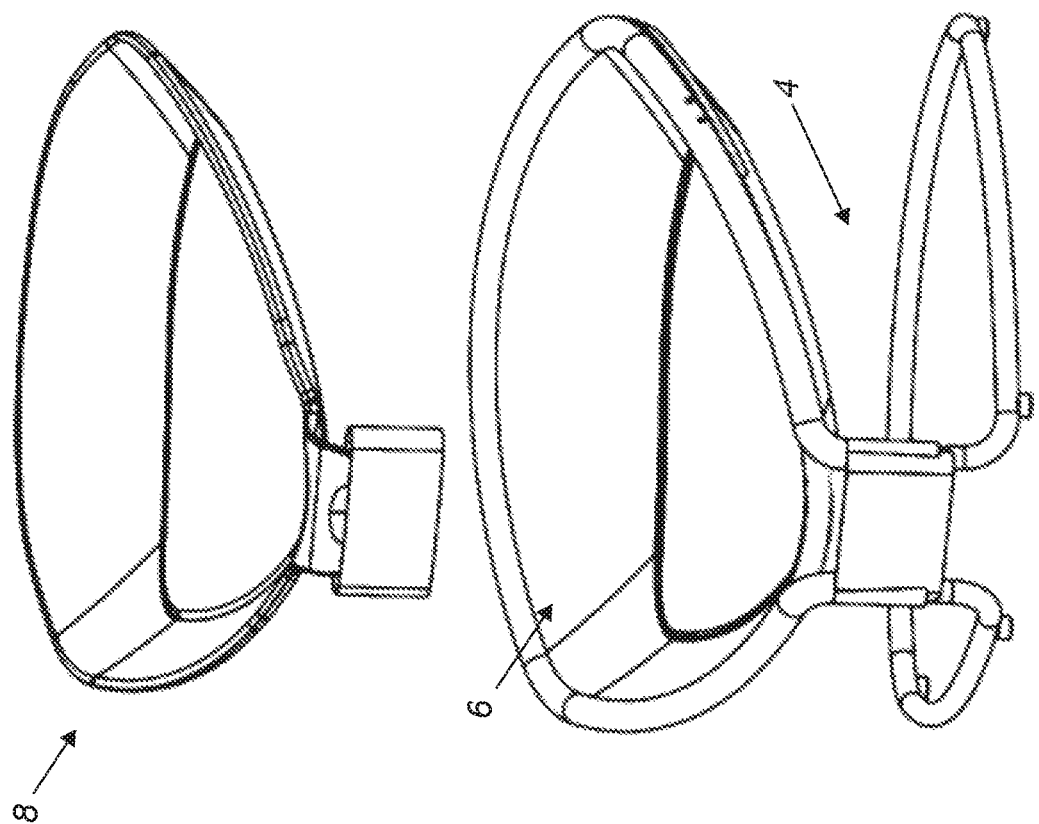
FIG. 7 is a partially exploded three-dimensional isometric view of FIG. 1.
Figure 8:
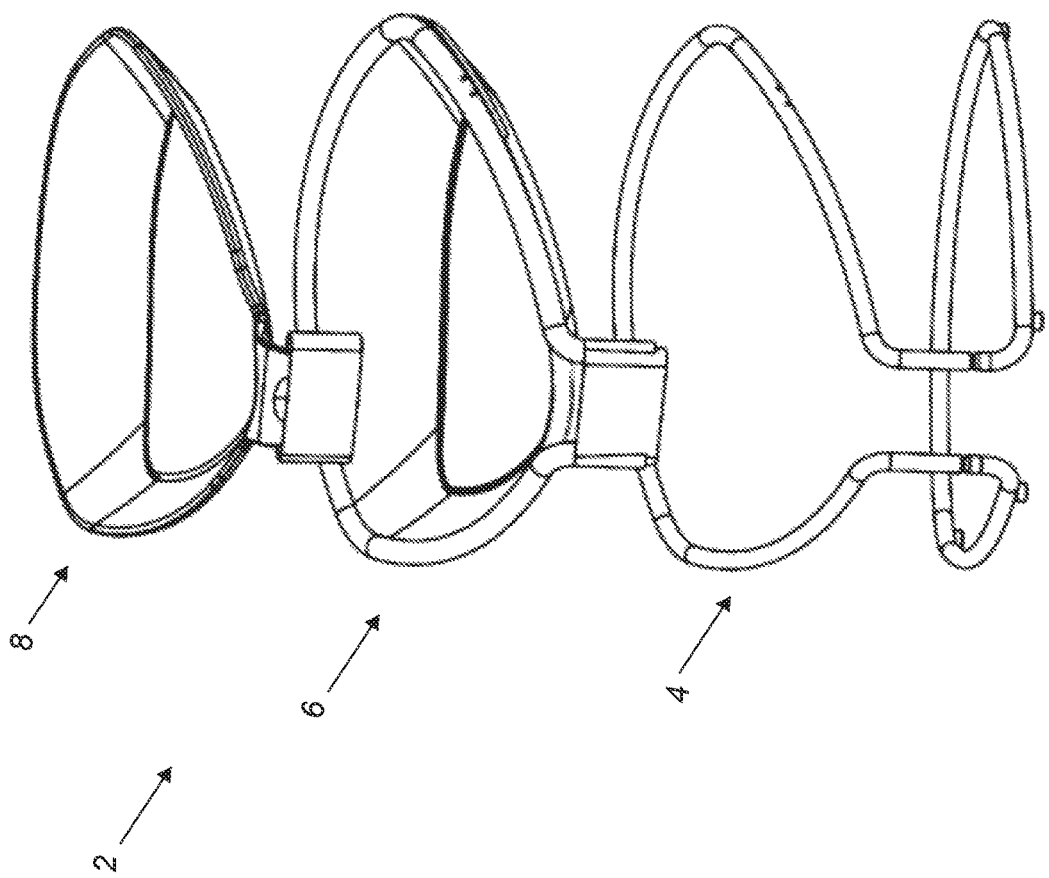
FIG. 8 is another partially exploded three-dimensional view of FIG. 1.
Figure 9:
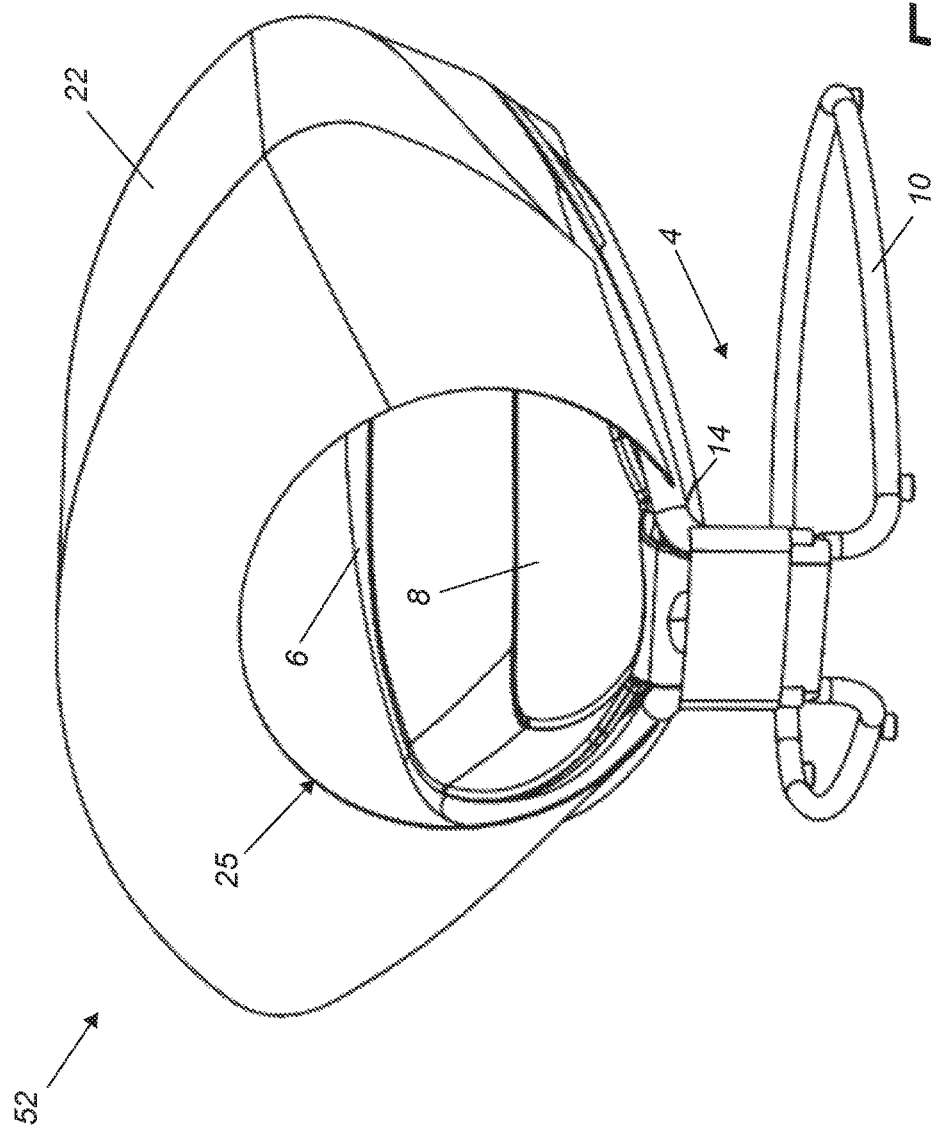
FIG. 9 is a three-dimensional isometric view of an alternative embodiment of the present invention including a canopy element.

FIG. 7 shows the padded insert 8 being lowered into the combination of the frame 4 and the fabric sling 6. FIG. 8 further shows a view where the fabric sling 6 is being lowered into the frame 4, and the foam insert 8 is above both elements.

III. Alternative Embodiment Raised Slung Pet Bed 52 with Canopy 22

Figure 10:
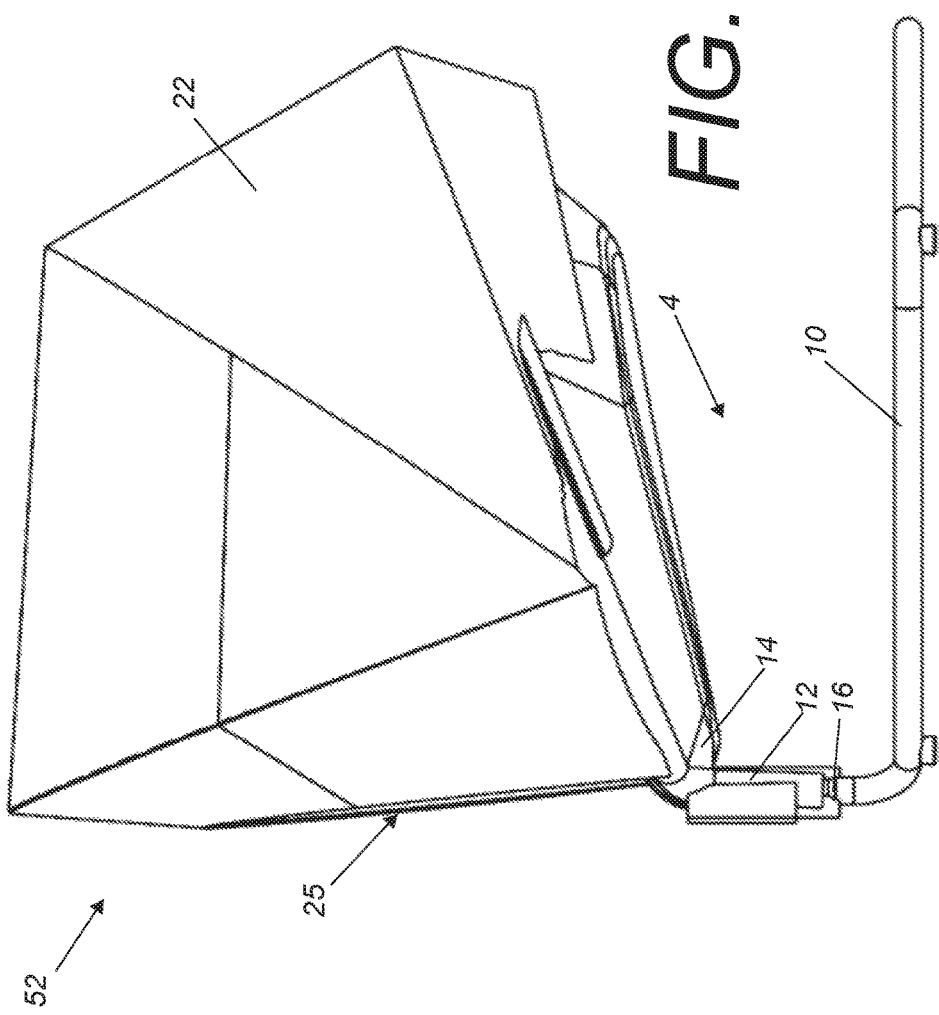
FIG. 10 is a side elevational view thereof.

FIGS. 9-12 use the identical raised slung pet bed 2 as discussed above, with the addition of a raised canopy 22 placed above the top loop 14 of the frame and the fabric sling 6 and foam insert 8. An opening 25 is located at the front end of the canopy 22. This provides an enclosed space for pets to feel safe and confined, which is soothing to many pets. FIG. 10 shows a side elevational view of this arrangement.

Figure 11:
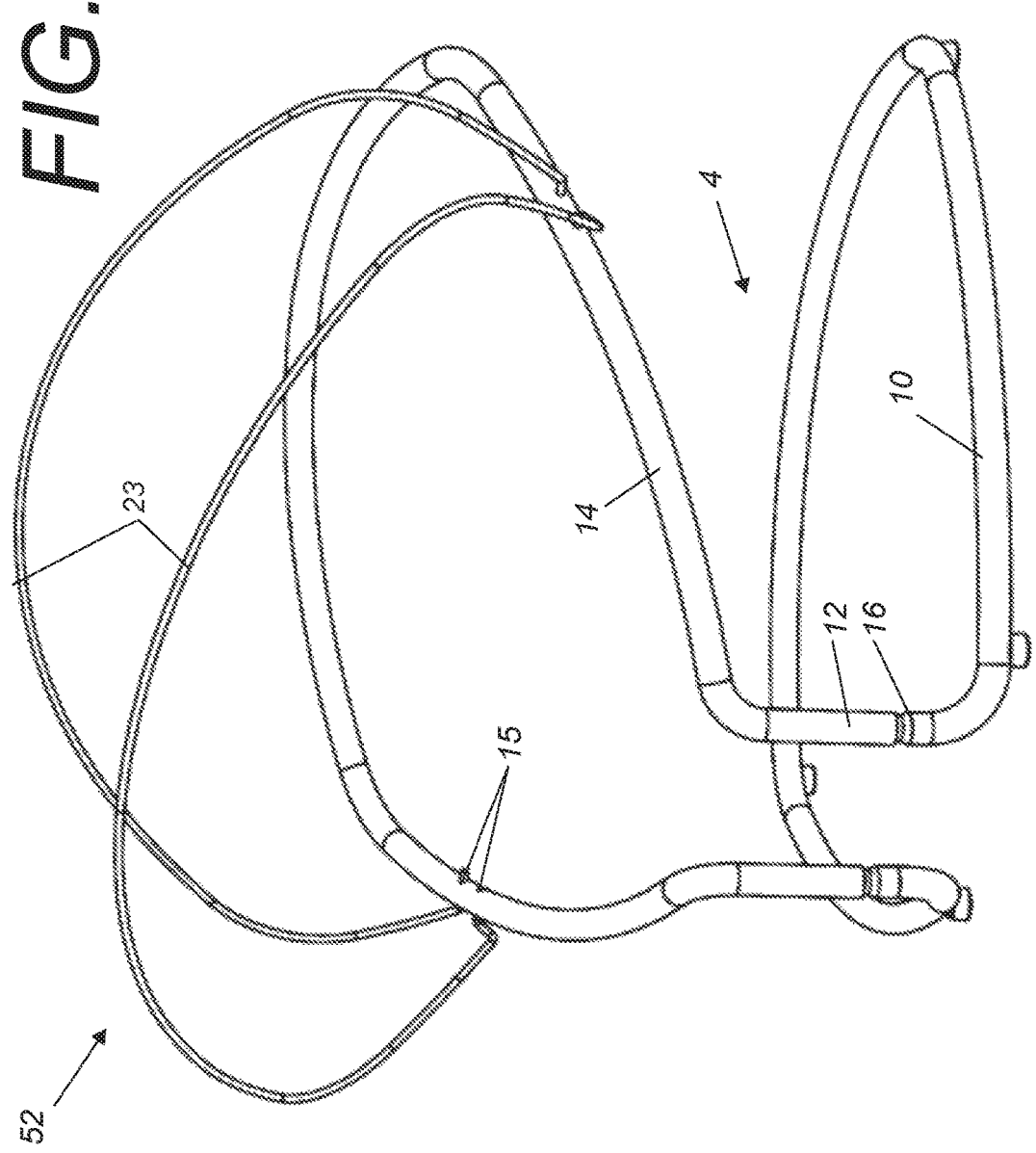
FIG. 11 is a three-dimensional isometric view thereof shown without the canopy element.
Figure 12:
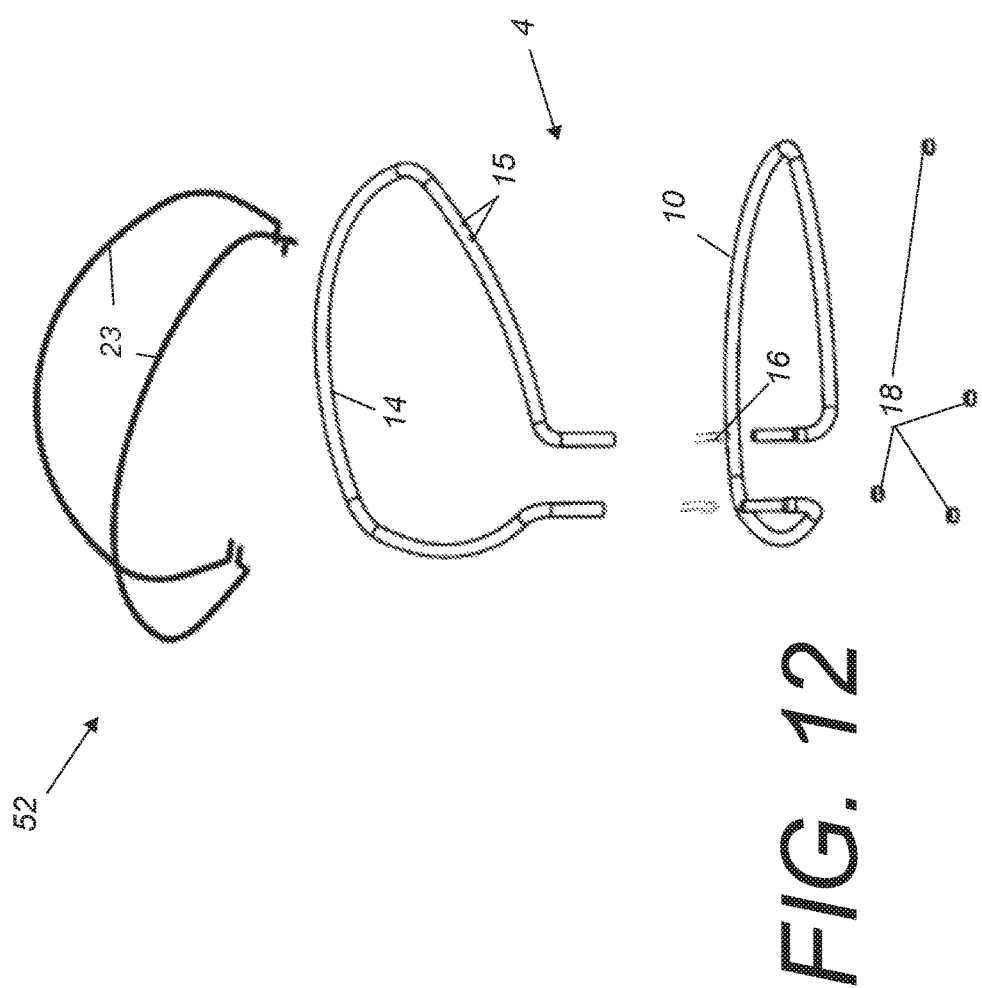
FIG. 12 is an exploded three-dimensional isometric view thereof.
Figure 13:
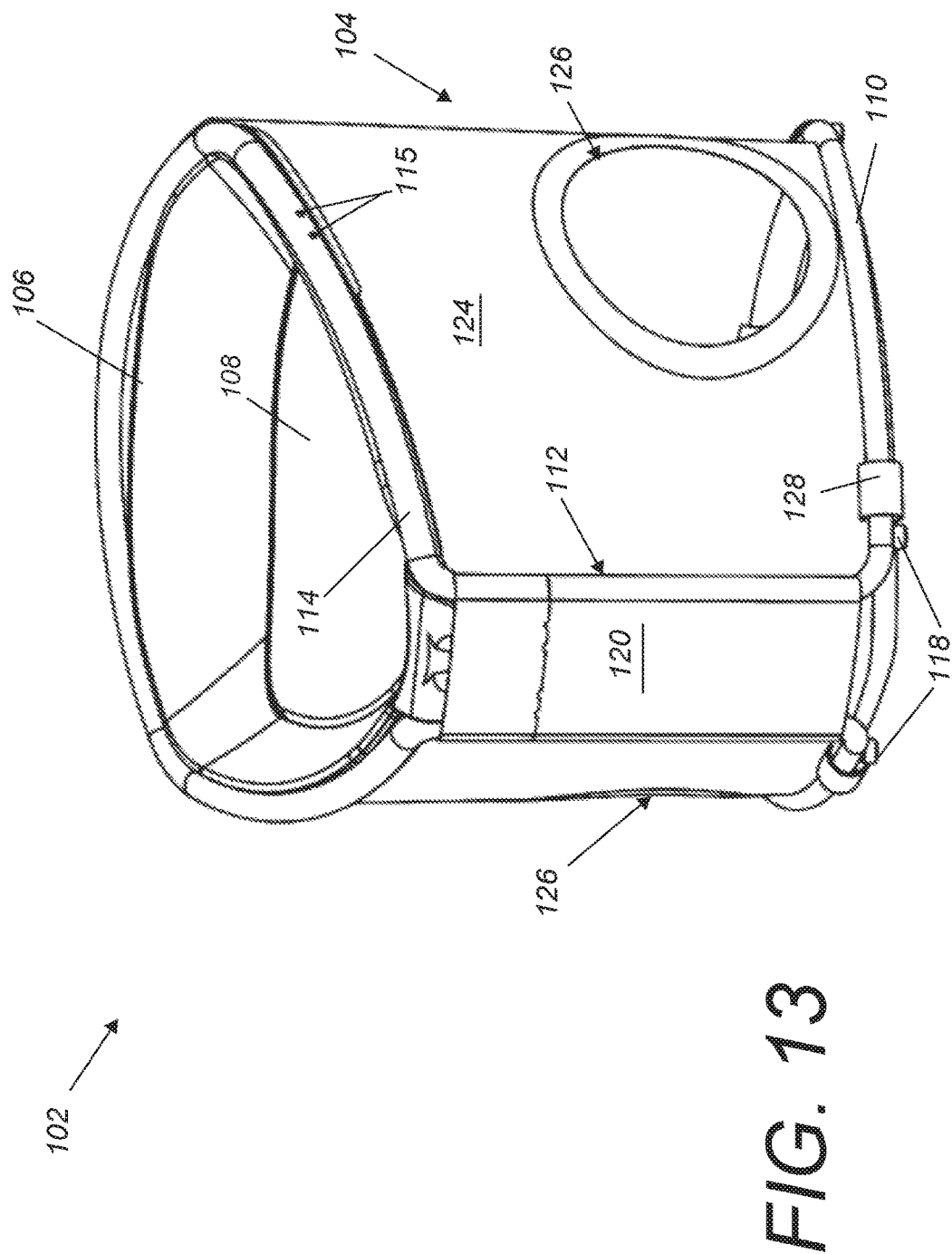
FIG. 13 is a three-dimensional isometric view of another alternative embodiment of the present invention.

FIG. 11 shows the assembly 52 without the canopy 22, and instead shows the canopy supports 23 which are beneath the canopy 22 and inserted into the insert holes 15 of the top loop 14 of the frame 4. FIG. 12 shows an exploded view of this assembly.

IV. Alternative Embodiment Raised Slung Pet Bed Assembly 102

FIGS. 13-17 show another alternative embodiment raised slung pet bed assembly 102 which includes most of the same components of the embodiments shown above. Here, the frame 104 again includes a top loop 114 and bottom loop 110, with feet 118 for stability, joined by a pair of elongated riser sleeves 112 which may contain optional springs 116. The elongated riser sleeves 112 extend the top loop 114 further above the bottom loop 110 than in the previous embodiments disclosed above. This allows for a cover 124 to be placed between the top loop, bottom loop, and risers, the cover having an opening 126, and the cover and opening creating a secondary space for pets to dwell. The cover 124 covers the space between the risers 112 with a front cover flap 120. As above, a fabric sling 106 is placed about the top loop 114 and an optional foam insert 108 may be placed within the sling. The foam insert is easily removable for washing.

Figure 14:
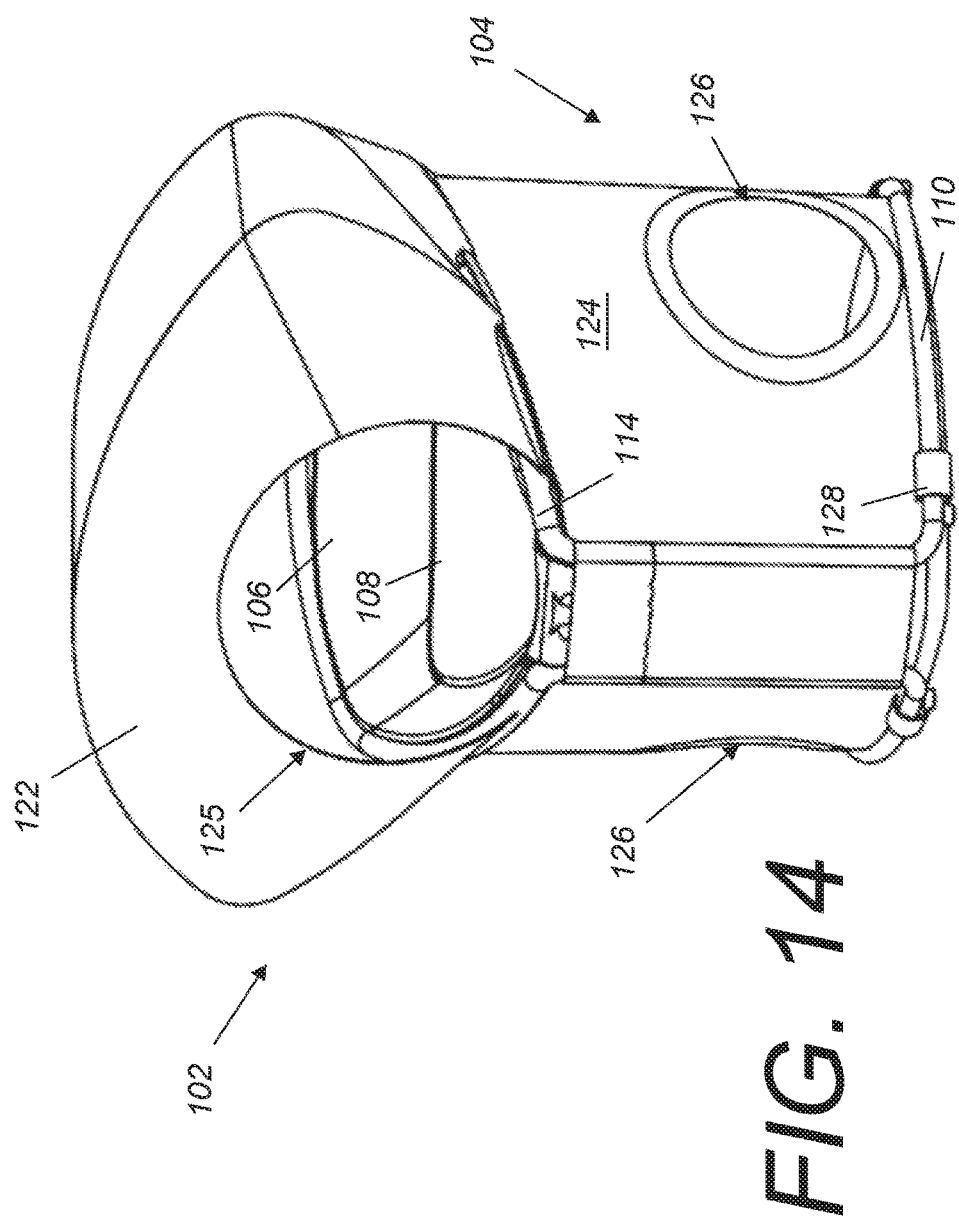
FIG. 14 is a three-dimensional isometric view thereof with a canopy attachment.
Figure 15:
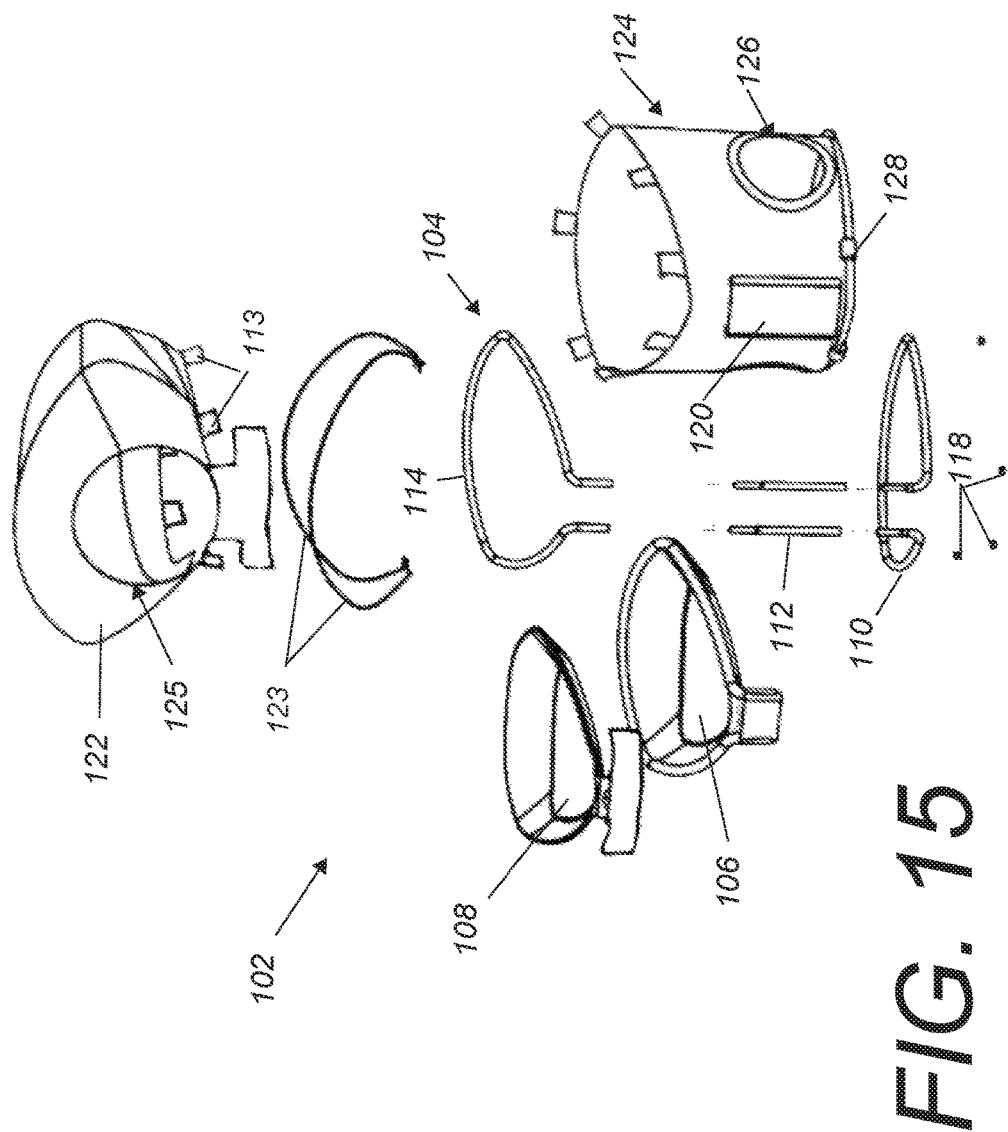
FIG. 15 is a three-dimensional exploded isometric view thereof
Figure 16:
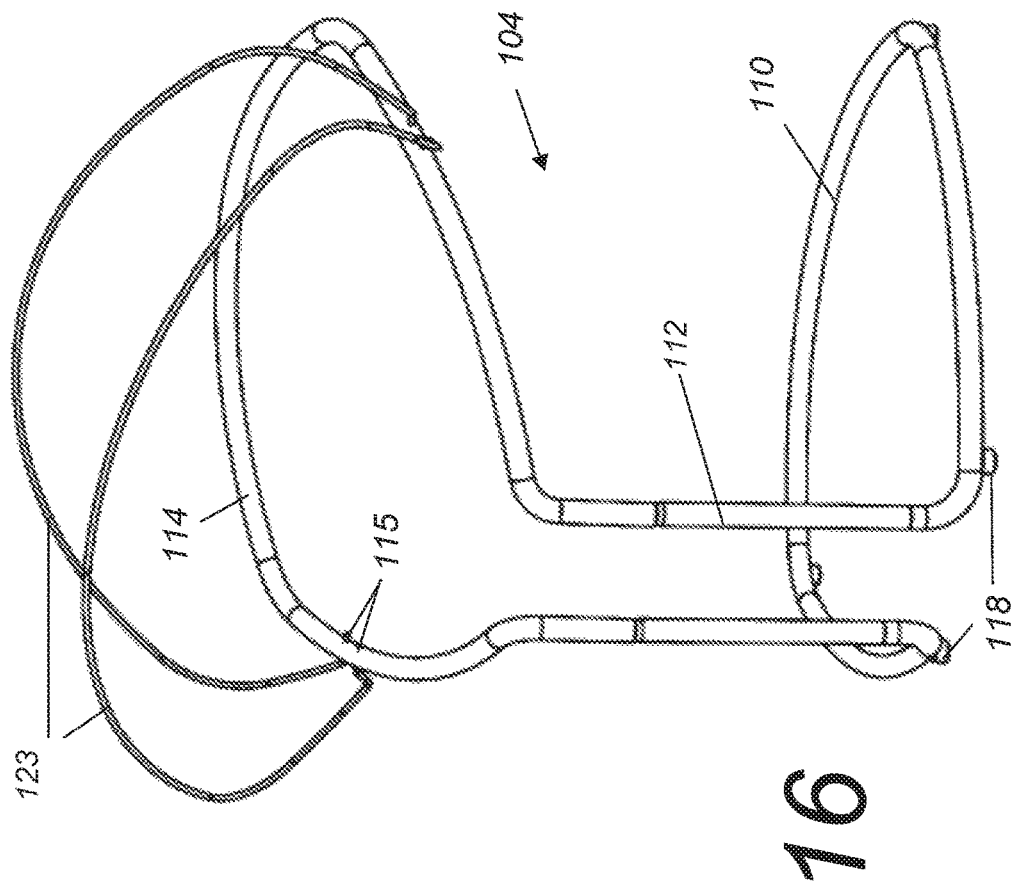
FIG. 16 is a three-dimensional isometric view of frame components thereof in an assembled configuration.
Figure 17:
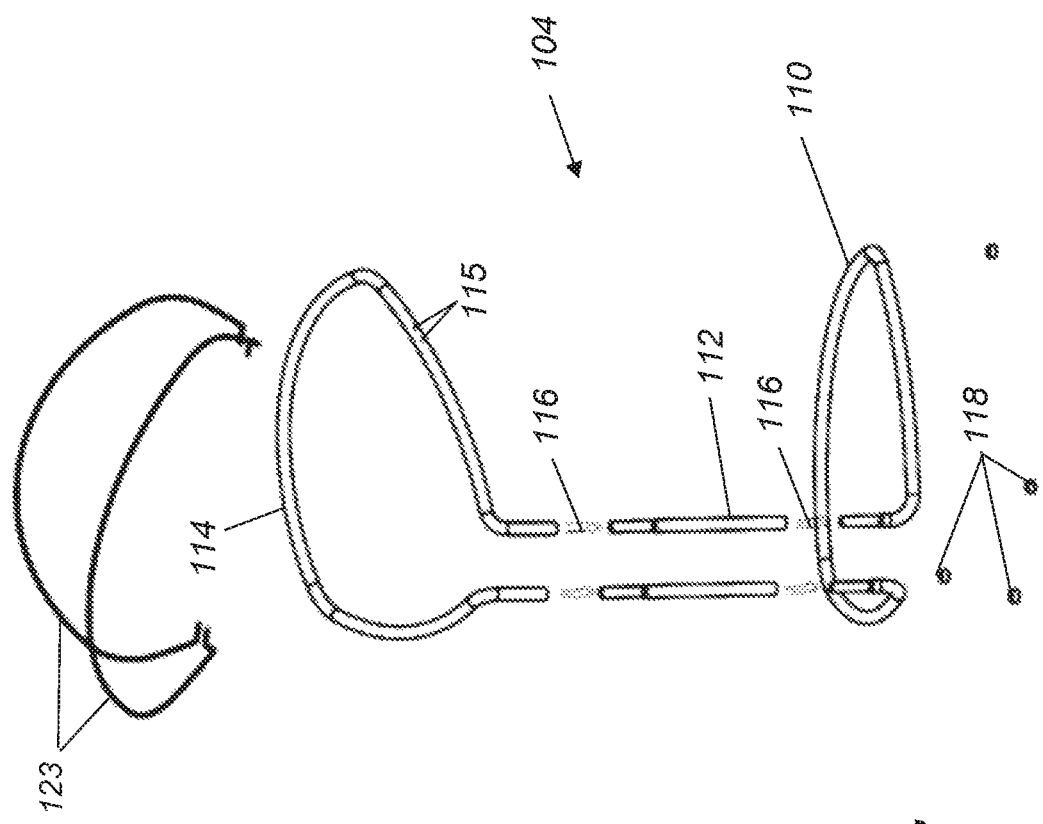
FIG. 17 is an exploded three-dimensional isometric view thereof.

FIG. 14 shows the same embodiment raised slung pet bed assembly 102 with a canopy 122 with an opening 125 similar to the embodiment 52 shown above. Similar to that embodiment, and as shown in FIGS. 15-17, there are a pair of canopy supports 123 which are inserted into insertion holes 115 of the top loop 114 of the frame 104 which support the canopy. The canopy 122 is connected to the top loop with flaps 113. Similarly, the cover 124 has flaps and base feet 128 for supporting the cover about the lower loop 110.

The raised bedding surface provides superior airflow around the pet when in use. Even in the instance of the alternative embodiment raised slung pet bed 102, the openings 126 allow airflow through the cover 124 and below the fabric sling 106. The optional canopy 22, 122 for all embodiments provides a personal space for the pet which can be placed or removed with ease.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A raised slung pet bed assembly comprising:
    a frame comprising a base portion and a raised portion joined by a vertical riser portion,
    said raised portion forming a semi-elliptical loop creating an open inner space, and
    said raised portion configured to cantilever away from said vertical riser portion;
    a fabric sling configured to be placed within said open inner space of said raised portion,
    said fabric sling further configured to engage said raised portion of said frame; and
    whereby said fabric sling is configured to provide a sleeping surface, whereby a front edge of said fabric sling is located in proximity with said vertical riser portion of said frame and a rear edge of said fabric sling is disposed off of the ground; and
    a lower cover configured to cover a space between said raised portion of said frame, said base portion of said frame, and said vertical riser portion of said frame, said lower cover configured to define a lower enclosed space; an opening within said cover configured to provide access to said lower enclosed space; and
    wherein said lower cover is configured to be affixed to said frame.

2. The raised slung pet bed assembly of claim 1, further comprising:
    a removable padded insert configured for temporary placement within a base of said fabric sling; and
    wherein said removable padded insert is machine washable with a commercial clothes washing machine.

3. The raised slung pet bed assembly of claim 1, further comprising:
    said raised portion of said frame including two pairs of receiver holes;
    a pair of canopy wire frames configured to be inserted into said two pairs of receiver holes such that each of said pair of canopy wire frames crosses above said upper portion of said frame;
    a canopy configured to be placed over said pair of canopy wire frames, said canopy configured to be temporarily affixed to said frame; and
    an opening in said canopy configured to provide access to the space defined above said fabric sling and within said open inner space of said raised portion of said frame.

4. The raised slung pet bed assembly of claim 1, further comprising:
- springs located within said vertical riser portion of said frame; and
- wherein said springs allow said raised portion to move in relation to said base portion about said springs, wherein said base portion remains stationary against a floor surface.

\* \* \* \* \*